Feb. 5, 1963
E. T. ABLE
3,076,362
TORQUE WRENCH
Filed July 28, 1961
2 Sheets-Sheet 2
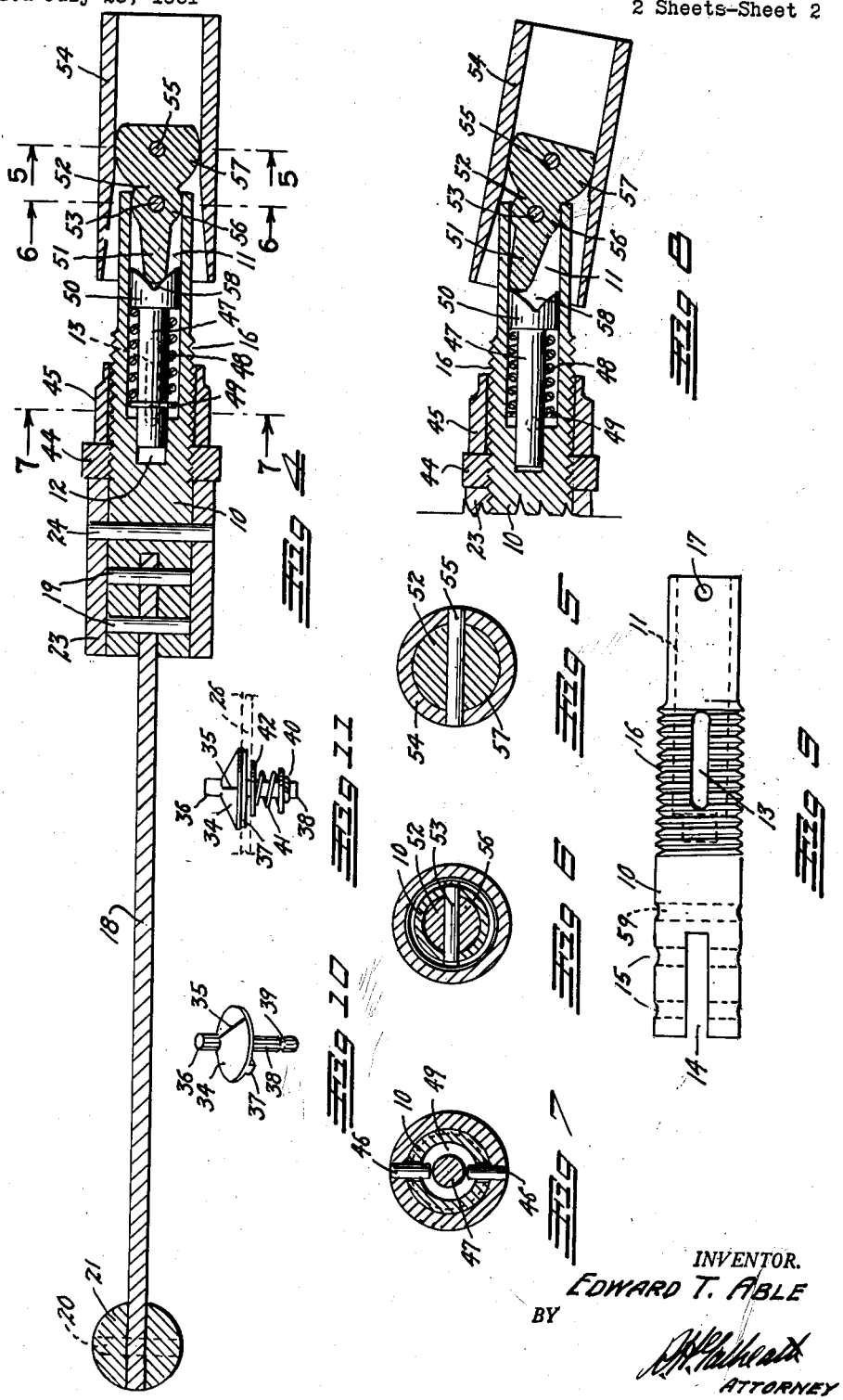
INVENTOR.
EDWARD T. ABLE
BY
ATTORNEY United States Patent Office 3,076,362
Patented Feb. 5, 1963

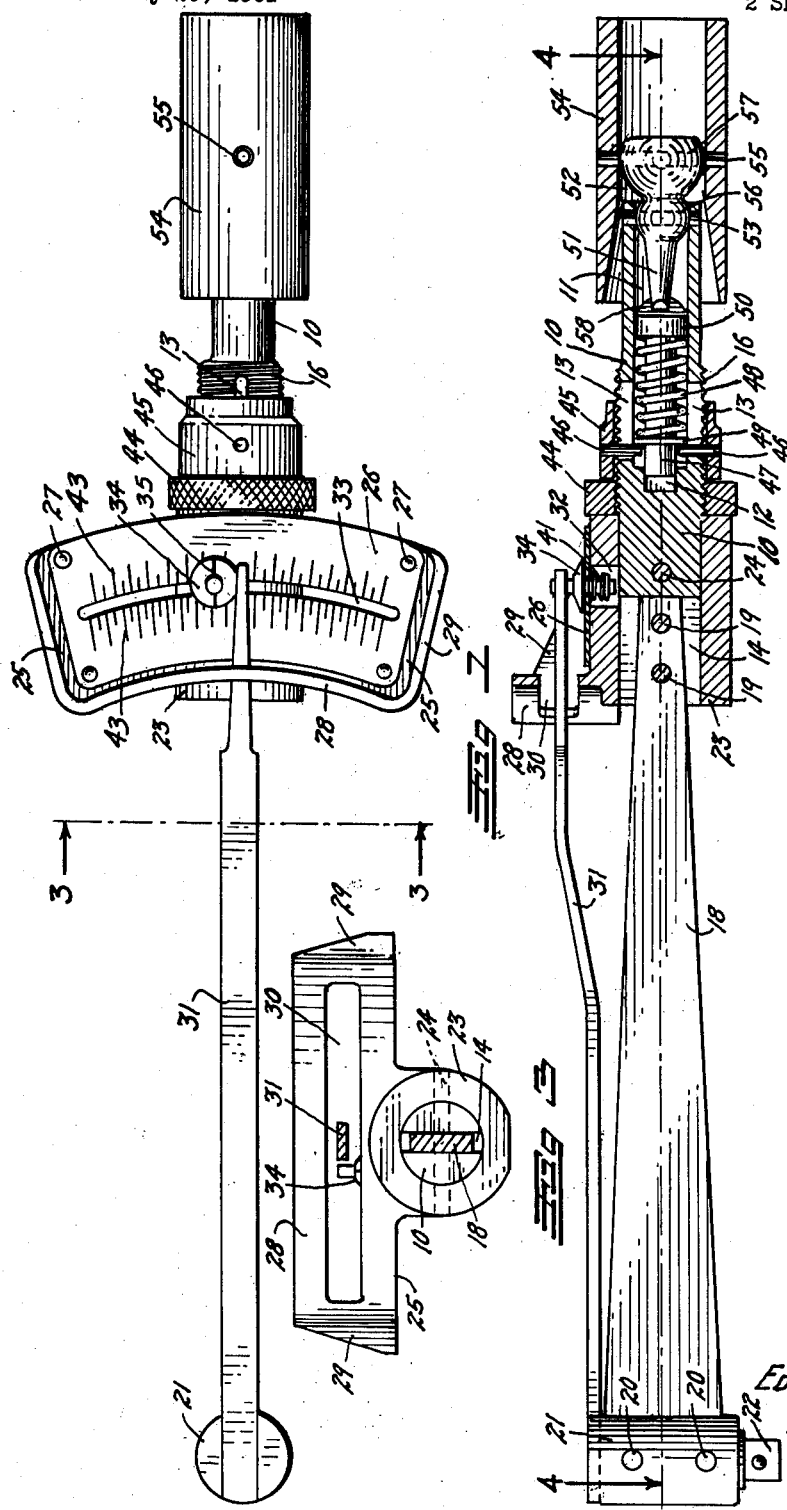

3,076,362
TORQUE WRENCH
Edward T. Able, Denver, Colo., assignor to B. K. Sweeney Mfg. Co., Denver, Colo., a corporation of Colorado
Filed July 28, 1961, Ser. No. 127,668
6 Claims. (Cl. 81—52.4)

This invention relates to a torque indicating wrench for accurately tightening threaded elements such as, bolts, nuts, studs, screws, etc. to a uniform predetermined tightness.

It has been common practice to provide torque wrenches with torque indicating pointers and index scales which will inform the user of the amount of torque being applied to a threaded element at any given instant. Such members are satisfactory for some uses and under some circumstances. However, such wrenches are not satisfactory when used in obscure, cramped and crowded quarters where it is difficult and in some instances impossible to see the index scale when either the wrench or the operator, or both are in a force-applying position.

One of the principal objects of this invention is to provide the torque scale of a torque indicating wrench with a simple and highly efficient reading-retaining device which will travel along the torque scale when force is being applied to the wrench and which will retain its maximum force position when the force is released so as to make it unnecessary for the operator to keep his eyes on the scale while exerting force on the wrench. He can make all the necessary force adjustments of the threaded element to attain the tightness desired by inspection of the position of the reading-retaining device at his convenience.

It is a tedious procedure with the conventional torque pointers and torque scales of torque wrenches to obtain absolute uniformity of tightness in a plurality of similar threaded devices. There is always a tendency for the pointer to fall short of or overpass the desired reading. The result is usually only an approximation, especially so when inspection is difficult due to improper lighting or inconvenient positioning of the scale.

Another object of this invention is to provide a sturdy, relatively simple, and exceedingly accurate wrench construction which will, when a preset torque is reached will give a positive, sensitive mechanical signal to the hand of the operator so that the application of force can be stopped at the exact preset point without reference to the scale.

A further object is to provide a torque wrench structure with means for relieving shearing stresses on all pivot elements in the wrench, thus, increasing the strength and wearing qualities of the wrench without increasing the bulk or cost thereof.

Other objects and advantages reside in the detail construction of the invention, which is designed for simplicity, economy, and efficiency. These will become more apparent from the following description.

In the following detailing description of the invention, reference is had to the accompanying drawing which forms a part hereof. Like numerals refer to like parts in all views of the drawing and throughout the description.

In the drawing:

FIG. 1 is a top plan view of the improved torque wrench;

FIG. 2 is a side view thereof, shown partially in longitudinal vertical medial section;

FIG. 3 is a cross-section taken on the line 3—3, FIG. 1;

FIG. 4 is a horizontal, longitudinal section looking downwardly on the line 4—4, FIG. 2;

FIGS. 5, 6 and 7 are cross-sections taken on the lines 5—5, 6—6, 7—7, respectively, FIG. 4;

FIG. 8 is a fragmentary portion of the section of FIG. 4 illustrating a second position of the internal mechanism;

FIG. 9 is a detail top view of a body member employed in the improved torque wrench;

FIG. 10 is a detail perspective view illustrating a position retaining slider employed in the invention; and FIG. 11 is a detail side view of the slider of FIG. 10.

The torque wrench is assembled about the body member shown in detail in FIG. 9 and designated in its entirety by the numeral 10. The body member 10 is formed from cylindrical stock with a rear hollow extremity of reduced diameter surrounding a longitudinally extending spring socket 11 which extends into the body member for substantially one-half the length of the latter. The spring socket 11 terminates in a plunger guide bore 12. Diametrically opposed, elongated guide openings 13 are formed in the top and bottom of, and open to, the socket 11. The forward extremity of the body member 10 contains a vertical, diametrically-positioned, bar-receiving slot 14 and the mid-portion of the body member is externally threaded as indicated at 16.

Rivet holes 15 are formed in the sides of the slot 14, a rivet hole 59 extends diametrically and horizontally through the body member between the slot 14 and the threads 16 and a pivot pin hole 17 extends across the rear extremity of the body member.

The narrower rear extremity of a vertically tapered flexible flexure bar 18 is fitted into the receiving slot 14 and is fixedly secured therein by means of suitable flush rivets 19 positioned in the rivet holes 15. The wider forward extremity of the flexure bar 18 is permanently riveted, by means of suitable rivets 20 in a diametrically-extending receiving slot in a cylindrical, vertical torsion head 21. A conventional, non-circular, usually square, socket wrench receiving stud 22 is formed on and extends downwardly from the head 22 to interchangeably receive convention wrench sockets (not shown) for engaging the work.

A housing 23 surrounds the inner extremity of the body member 10 and is permanently mounted thereon by means of a horizontal cross rivet 24 extending through the rivet hole 59. A flat, arcuate gauge plateform 25 is cast integrally with the housing and extends oppositely outward from the top thereof to support an index scale plate 26, provided with suitable torque scales 43. The plate 26 is permanently attached to the platform by means of suitable attachment elements 27.

An arcuate front wall or flange 28 is formed on the platform 25, along the arcuate front edge of the latter, which terminates at its extremities in inclined end flanges 29. An elongated pointer slot 30 is formed in the front flange 28 parallel to and above the platform 25 through which a pointer 31 projects. The forward extremity of the pointer 31 is imbedded in and welded or otherwise fixedly mounted in the top of the head 21 over the forward extremity of the torsion bar 18.

The platform 25 is arcuately slotted by a relatively wide slot 32 and the scale plate 26 is similarly arcuately slotted by a relatively narrow slot 33 positioned medially of the wide slot 32. A position-retaining slider 34 rests on the scale plate 26. The slider 34, shown more in detail in FIG. 5, is provided with index markings 35 and is formed with: an upwardly extending stem 36, which is engaged by the pointer 31; an elongated bottom key 37, which slidably fits into the scale plate slot 33; and a downwardly projecting shank 38, provided with a slip-ring groove 39. When assembled, a slip-ring 40 in the groove 39 maintains a relatively-light compression spring 41 in place on the shank 38 which acts to force a friction washer 42 into frictional engagement with the bottom of the scale plate 26 to retain the slider in any pre-placed position along the torque scales 43. The slider 34 can be placed on either desired side of the pointer 31 by simply flexing the latter upwardly and sliding the slider beneath it.

As thus far described, the invention is usable for all conventional torque wrench uses. For if the head stud 22 be fitted into a wrench socket in position upon the head of a cap screw, the cap screw can be tightened by simply swinging the body member 10 clockwise (downwardly in FIG. 1). This will swing the scale plate 26 downwardly relative to the pointer 31 causing the latter to force the slider 34 to travel along the scale to the position of maximum exerted torque. Thus, even if the scale is not visible to the user when applying the torque, he can, by repeated trials and repeated reference to the position of the slider, tighten the cap screw to the exact tightness desired.

In addition to the position retaining advantages of the slider, an automatic signalling feature is provided to signal to the user's hand when a desired torque has been applied without it being necessary to refer to the torque scales or pointer. This is accomplished by the following elements. An annular, knurled, preset, release nut 44 is threaded on the threads 16 of the body member 10 rearwardly of the housing 23 and a slide collar 45 is slidably fitted over the threads 16 rearwardly of the release nut 44. The collar 45 is free to move longitudinally of the body member 10 but is prevented from rotating thereon by means of dowel pins 46 fixedly mounted in the collar and extending radially inward through the guide openings 13 and into the spring cavity 11 to positions closely adjacent, and on opposite sides of a spring plunger 47.

A latch spring 48, of the compression type, surrounds the plunger 47 and constantly exerts expansive pressure between a spring washer 49, in contact with the dowel pins 46, and a plunger head 50 formed on the plunger 47 so as to constantly urge the head 50 rearwardly against the rounded forward extremity of a trigger arm 51 formed on and projecting forwardly from a tiltable trigger member 52. The head 50 is provided with a transverse, somewhat V-shaped notch 58 in which the rounded extremity of the trigger arm 51 normally rests. The two sides of the notch 58 are convexly rounded so as to provide high points over which the extremity of the trigger arm must ride when moving sidewardly.

The trigger member 52 is tiltably mounted in the rear extremity of the body member 10 on a pivot pin 53 positioned in the pivot hole 17 and a tubular hand grip 54 is tiltably and medially mounted upon a tilt pin 55 passing through the trigger member rearwardly of the pivot pin 53.

It is desired to call particular attention to the conformation of the trigger member 52. The latter is formed with two spherical portions: a forward spherical portion 56 having a radius equal to the internal radius of the spring socket 11 with the pivot pin 53 passing through the center of the sphere; and a larger rear spherical portion 57 having a radius equal to the internal radius of the tubular hand grip 54 with the tilt pin 55 passing through the center of the latter sphere. This construction causes the forward spherical portion 56 to fit snugly into the body portion 10 at all angular positions of the trigger member, as shown in FIG. 6, and similarly causes the larger spherical portion 57 to fit snugly into the hand grip 54 at all tilted positions of the latter, as shown in FIG. 5. Thus, the pins 53 and 55 are relieved of all shearing strains since the spherical portions serve as work transmitting bearings.

Let us assume that the hand grip 54 is drawn downwardly in FIGS. 1 and 4 when the wrench is in place on the work. The force applied to the hand grip 54 is transmitted to the body member 10 by the trigger arm 51 in the notch 58 as shown in FIG. 4. The pressure of the trigger arm against the arcuately inclined side of the notch 58 tends to force the plunger 47 forwardly against the bias of the spring 48. Eventually a point will be reached when this pressure will compress the spring sufficiently to allow the extremity of the trigger arm to snap over the high point of the convexly curved side of the notch 58 and against the inner wall of the spring socket 11, as shown in FIG. 8, thus, giving a definite indication that a predetermined torque has been applied to the work.

The presetting of the release point is accomplished by adjusting the position of the release nut along the threads 16. For instance, let us assume that it is desired to have the signal occur when a torque of 40 foot-pounds have been applied to the work. The socket-receiving stud 22 is gripped in a vise or other stationary holding device and the nut 44 is rotated to force the slide collar rearwardly. The dowel pins of the rearwardly moving collar act against the thrust washer 49 to impart compression to the latch spring 48. The hand grip 44 is now drawn upon until the trigger arm releases and the release point is noted by the position attained by the slider. If this be less than 40 foot-pounds, additional rearward turns are given to the release nut, if more than 40 foot-pounds, the release nut is rotated forwardly and a second trial is made. This is repeated until the trigger arm 51 releases at exactly 40 foot-pounds. The wrench can now be applied to the work with assurance that a signal will be received whenever 40 foot-pounds of torque have been applied to a workpiece. It will be noted that the signal functions regardless of the direction of rotation of the workpiece, and that the trigger arm 51 automatically and instantly resets itself in the notch 58 whenever the applied force is released.

It will also be noted that the slotted flange 28 provides protection for the pointer 31 to prevent the latter from being accidentally bent toward or away from the flexure bar 18.

While a specific form of the improvement has been described and illustrated herein, it is to be understood that the same may be varied within the scope of the appended claims, without departing from the spirit of the invention.

Having thus described the invention, what is claimed and desired to be secured by Letters Patent is:

1. A torque wrench comprising: a body member; a flexure bar mounted in and projecting forwardly from said body member; a head on the forward extremity of said bar; means for connecting said head to a work element for rotation of the latter; a housing fixedly surrounding the forward portion of said body member, the rear portion of said body member projecting rearwardly from said housing; an axial spring socket formed in said rear portion and opening to the rear extremity thereof; a plunger head axially movable in said socket; a rearwardly directed notch in said plunger head; a spring in said socket acting to urge said plunger head rearwardly; a trigger member tiltably mounted in said socket rearwardly of said plunger head; a trigger arm formed on and projecting forwardly from said trigger member and terminating in the notch of said plunger head, said trigger member projecting rearwardly from said body member to provide means for applying a sideward force on said body member to flex said flexure bar, said force being transmitted to said body member by the resistance of said notch to sideward movement of the trigger arm therein, until the compression bias of said spring is exceeded; regulating means operable from the exterior of said body member for varying and presetting the compression bias of said spring, said regulating means comprising a longitudinally movable collar surrounding said body member; dowel pins extending from said collar through axially elongated openings in said body member and terminating rearwardly of said spring to absorb the rearward thrust of the latter; and means for forcing said collar rearwardly to exert compression against said spring.

2. A torque wrench as described in claim 1 in which the means for forcing said collar rearwardly comprises threads formed on said body member rearwardly of said housing and an annular nut threaded on said threads and acting against said collar.

3. A torque wrench as described in claim 2 having a tubular hand grip surrounding the rearwardly projecting portion of said trigger member and a tilt pin extending medially and diametrically through said hand grip and through said trigger member to tiltably mount the former on the latter.

4. A torque wrench as described in claim 3 having a spherical mid-portion formed on said trigger member in contact with the internal wall of said spring socket to provide a bearing for said trigger member.

5. A torque wrench as described in claim 4 having a second spherical terminal portion on said trigger member about said tilt pin in contact with the interior wall of said hand grip to provide a bearing for the latter on said trigger member.

6. A torque wrench comprising: a body member; a flexure bar mounted in and projecting forwardly from said body member; a head on the forward extremity of said bar; means for connecting said head to a work element for rotation of the latter; a housing fixedly surrounding the forward portion of said body member, the rear portion of said body member projecting rearwardly from said housing; an axial spring socket formed in said rear portion and opening to the rear extremity thereof; a plunger head axially movable in said socket; a spring in said socket acting to urge said plunger head rearwardly; a trigger member tiltably mounted in said socket rearwardly of said plunger head and projecting rearwardly from said body member to provide means for applying a sideward force on said body member to flex said flexure bar; inter-engaging means between said trigger member and said plunger head acting to transmit said force to said body member until the compression bias of said spring is exceeded; a longitudinally movable collar surrounding said body member; dowel pins extending from said collar through axially elongated openings in said body member and terminating rearwardly of said spring to absorb the rearward thrust of the latter; and means for varying the position of said collar to pre-set the compression bias of said spring.

References Cited in the file of this patent

UNITED STATES PATENTS

| 2,385,591 | Sturtevant | Sept. 12, 1945 |
| 2,934,985 | Mutolo et al. | May 3, 1960 |

FOREIGN PATENTS

| 995,105 | France | Aug. 14, 1951 |
| 24,341 | Australia | July 23, 1930 |
| 282,970 | Italy | Feb. 26, 1931 |
| 526,509 | Italy | May 18, 1955 |